T. F. MORRISSEY.
SAWING MACHINE.
APPLICATION FILED JULY 25, 1910.
1,019,720.
Patented Mar. 5, 1912.
3 SHEETS—SHEET 3.
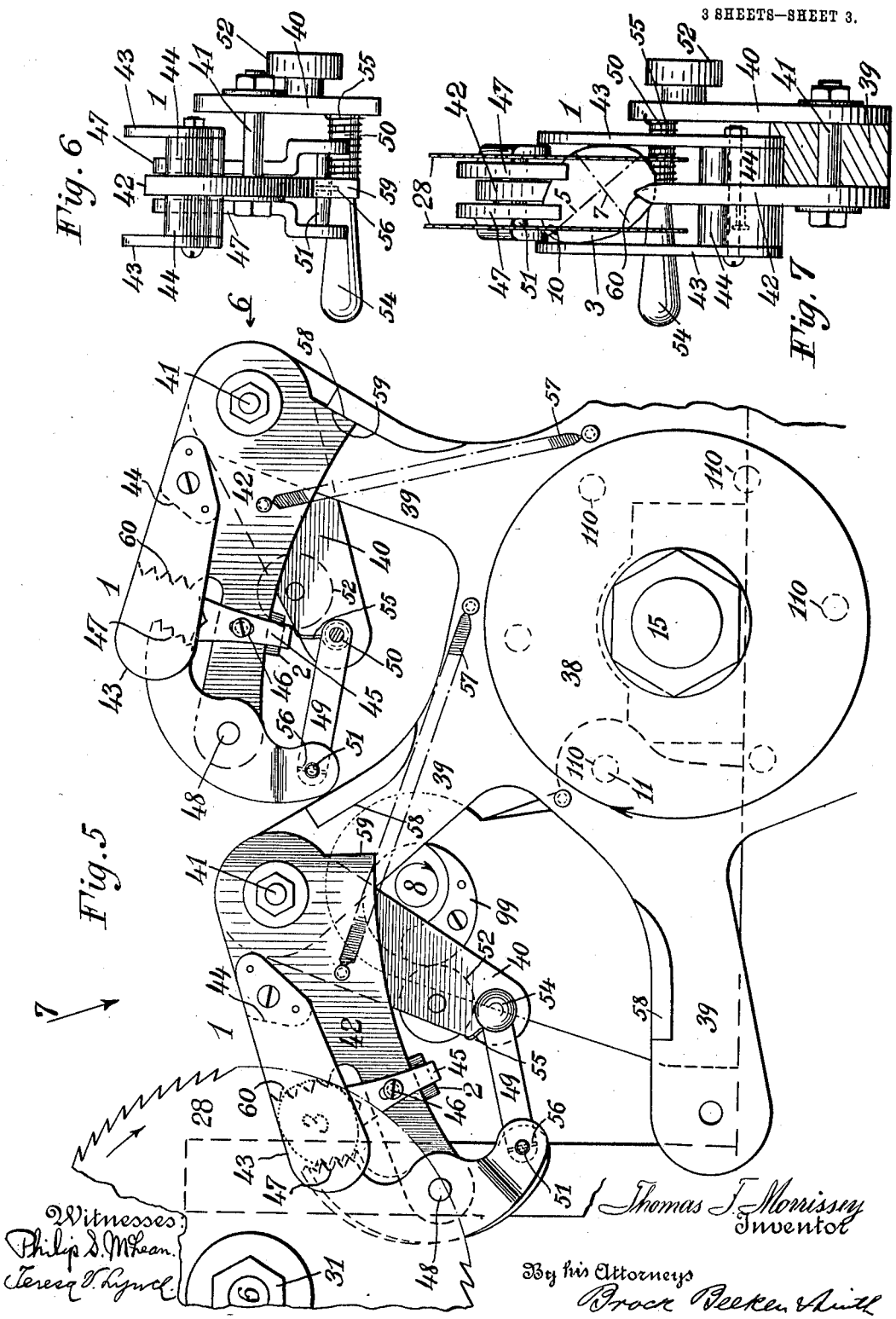

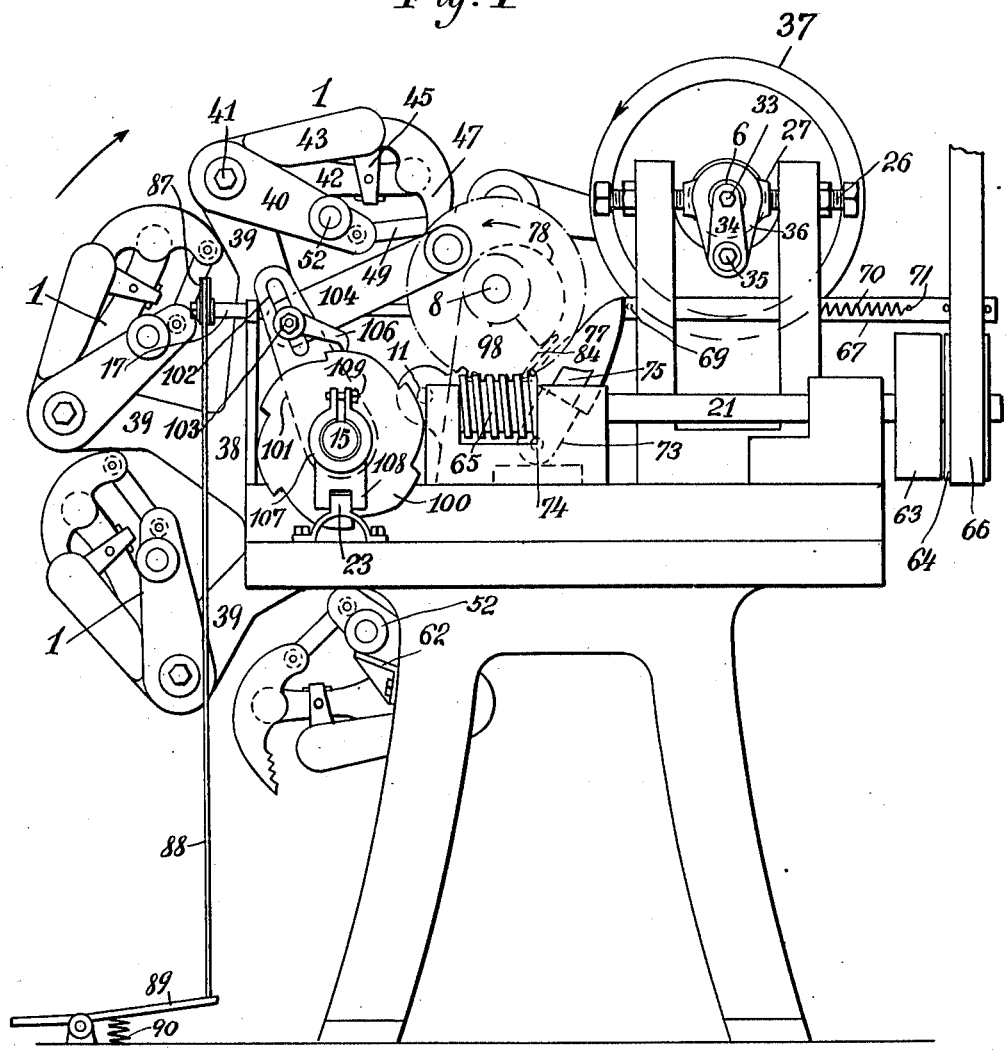

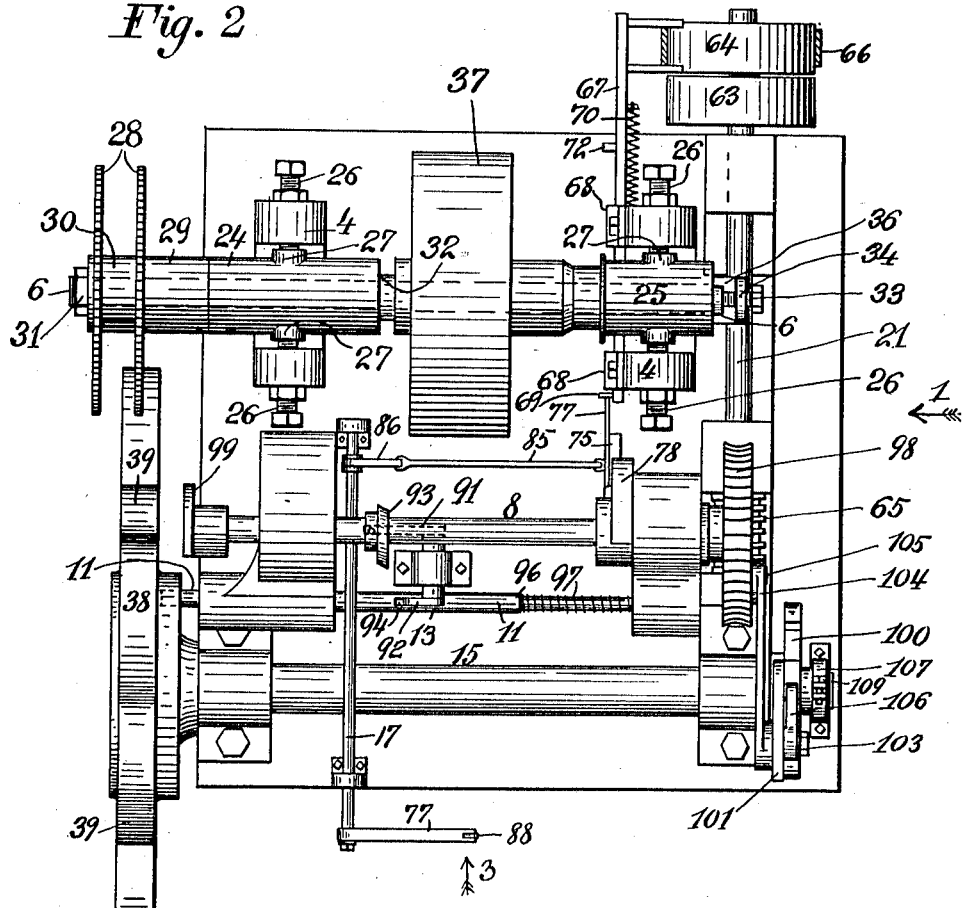
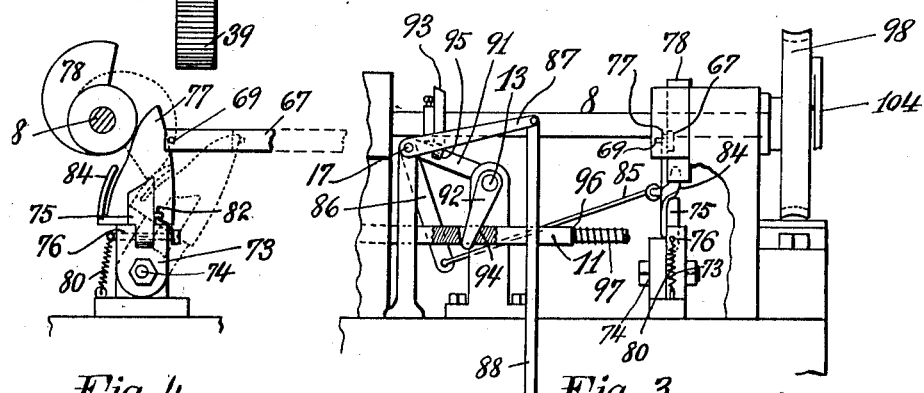

UNITED STATES PATENT OFFICE.

THOMAS F. MORRISSEY, OF WEST ORANGE, NEW JERSEY, ASSIGNOR TO UNITED BUTTON COMPANY, A CORPORATION OF NEW YORK.

SAWING-MACHINE.

1,019,720. Specification of Letters Patent. Patented Mar. 5, 1912.

Application filed July 25, 1910. Serial No. 573,799.

*To all whom it may concern:*

Be it known that I, THOMAS F. MORRISSEY, a citizen of the United States, and a resident of West Orange, in the county of Essex and State of New Jersey, have invented certain new and useful Improvements in Sawing-Machines, of which the following is a specification.

The present invention relates generally to sawing machines and has more particularly reference to a sawing machine used for the purpose of dividing ivory nuts.

The main object of the invention is the production of a sawing machine for ivory nuts or other material which will be practically automatic in action.

One feature of the invention resides in a carrier which moves past a saw and in means for effecting a relative movement between a work holder, on the carrier, and the saw to bring them toward each other. The saw is preferably rotatable and continuously running. The carrier may be of any suitable type, such as an endless carrier, but preferably, and as herein shown, it is of the rotary type and has imparted to it a step-by-step movement. The movement of the carrier is for the purpose of successively bringing each of a plurality of work holders opposite to the saw, and the relative movement between the work holder and saw is for the purpose of bringing the saw and the work into engagement. This relative movement may be effected by moving the saw toward the work holder, but preferably, and as herein disclosed, the work holder is moved bodily toward the saw. In the present embodiment, the work holder is normally held in its retracted position and is caused to move toward the saw when the carrier is at rest.

Preferably the machine ceases its operation after each cycle of operations, with the exception of the saw which is constantly running. The operation of the parts during each cycle of operations is preferably so timed that the work holder which is opposite the saw is first withdrawn, then the carrier is advanced one step bringing a new work holder opposite to the saw, and then this second work holder is projected or moved toward the saw, remaining there in this position until the next cycle commences. In moving the work holder toward the saw it has been found most advantageous to cause the movement to take place in a substantially radial line with reference to the saw. The work holder may be mounted in many ways on the carrier, but in this instance it is pivotally supported.

The machine preferably embodies a stopping and starting mechanism, and a latch which is automatically thrown in at the end of each cycle. A drive shaft, under the control of the stopping and starting mechanism, imparts motion to a cam shaft, and to the shaft carrying the rotatable carrier. This cam shaft preferably controls the withdrawal of a locking device for the carrier, the outward movement of the work holder, and a restoring device which throws the latch in and stops the drive shaft.

The art of sawing ivory nuts presents peculiar difficulties. This is especially due to the irregular shape of the nut. On this account very adaptable and efficient work holding devices must be employed in order that the nut may be firmly held while the sawing operation takes place.

Another feature of the invention resides in the peculiar work holding device employed. This device consists preferably of a fixed jaw, a movable jaw and a cradle or idle member pivotally supported at an angle to the fixed jaw and means for exerting tension on the movable jaw thereby holding the work against the fixed jaw and the cradle. Preferably confining flanges are used on the fixed jaw embracing the work at an angle to the jaws and to the cradle. These flanges are for the purpose of properly positioning the nut with reference to the saw so that the nut may be divided along certain lines in order that the material may be utilized to the fullest extent.

The jaws of the work holder are preferably closed by a toggle in connection with which are utilized means for holding the movable jaw closed against the fixed jaw, means are further provided for opening said jaws, and, finally, means are provided for acting on the toggles to increase the tension on the movable jaw against the fixed jaw and to swing the work holder outwardly toward the saw. Thus the means which act to move the work holder toward the saw also increase the pressure on the jaws with an unyielding grip so that the work is held extremely firmly during the sawing operation.

In the specific form disclosed the work holder consists of a supporting member pivoted on the carrier. The fixed jaw is carried by this supporting member. The movable jaw is pivoted on the fixed jaw and a toggle connects one end of the movable jaw with the fixed jaw. The cradle is pivotally mounted on the supporting member at an angle to the jaws, and a spring connects the supporting member with the carrier to hold the work holder in its retracted position. Means are provided for opening and closing the jaws, and means are provided for acting on the toggles to close the jaws tightly and to move the supporting member around its pivotal support.

Another feature of the invention resides in the means for adjusting the saw with reference to the work holder. The saw shaft is mounted in bearings which can be adjusted transversely to bring the saw nearer to or farther away from the work holder, and means are carried by said bearings for adjusting the shaft longitudinally.

Other features of construction, combinations of elements and arrangement of parts will appear as the specification proceeds.

In the accompanying drawings the invention is embodied in a concrete and preferred form, but changes of construction may be made without departing from the legitimate and intended scope of the invention.

In the said drawings: Figure 1 is a side elevation of the machine, embodying the invention looking in the direction of the arrow I in Fig. 2. Fig. 2 is a plan view of the machine, with the work holders removed. Fig. 3 is a detail view of parts of the stopping and starting mechanism looking in the direction of the arrow 3 in Fig. 2, the shaft 15 not being shown. Fig. 4 is a detail view of the restoring cam and adjacent elements. Fig. 5 is an enlarged detail view of two of the work holders and adjacent parts, the view of the work holders being from that side which is opposite the one shown in Fig. 1. Fig. 6 is a detail view of the work holder, looking in the direction of the arrow 6 in Fig. 5. Fig. 7 is another detail view of the work holder, looking in the direction of the arrow 7 in Fig. 5, the arm 39 being shown in section.

Similar characters of reference indicate corresponding parts in the different views.

28 indicates a rotary saw, of which there are two in the present instance, mounted on the shaft 6. Mounted on the shaft 15, extending parallel to the shaft 6, is a rotary carrier 38 having a plurality of arms 39 on which are mounted the work holders 1. 11 is a sliding pin constituting a locking device for the carrier and adapted to engage with the apertures 110 in the carrier after each step of the latter. 8 denotes a cam shaft which carries three cams, one, the cam 99 for moving the work holder outward; another, the cam 93 for withdrawing the locking pin 11; and a third, the cam 78 for restoring the latch 73 of the stopping and starting mechanism.

The shaft 6 is journaled in bearings 24 and 25 mounted in the brackets 4 by means of the bolts 26 engaging the bosses 27 of the bearings in such a manner that the bearings 24 and 25, and with them the shaft 6, can be adjusted transversely of the axis of the shaft 6 or nearer to or farther away from the work holders 1. The saws are mounted on the shaft 6 by means of a collar 29, a collar 30 and a washer and nut 31. The shaft is held against endwise movement by means of a shoulder 32, formed on said shaft and bearing against the bearing 24, and a bolt 33 at that end of the shaft which is opposite to the saws. The bolt 33 passes through an upright 34 which is bolted at 35 to a bracket 36 carried by the bearing 25. In this manner the shaft 6 can be adjusted longitudinally. Motion is imparted to the shaft 6 by means of the pulley 37.

All the work holders are constructed alike and only one will be described.

42 indicates a supporting member, pivoted at 41 to the carrier arm 39, and provided with the fixed jaw 60. 47 is the movable jaw consisting in this instance of two members spaced apart and pivotally mounted on the supporting member at 48. The parts are so arranged that the fixed jaw 60 extends centrally of the space between the members of the movable jaw. A toggle formed by the links 40 and 49 connects one end of the movable jaw 47 with the supporting member 42. The members of the movable jaw 47 straddle the link 49 and are connected together by means of the pin 51, which pin also passes through the link 49. In order to permit the members of the movable jaw 47 to move independently of each other to accommodate themselves to the shape of the nut, the pin holes in the jaw 47 and in the link 49 are made larger than the diameter of the pin 51. Likewise, a vertical pin 56 passes through the link 49 and pin 51, thereby forming in combination with said pin 51 a universal joint. Mounted on the pivot 46 of the supporting member 42 is the cradle 45. This cradle is at an angle to the faces of the fixed and movable jaws and may be in the form of a V-shaped member embracing the supporting member 42 and having a cushion 2 of rubber or other elastic material. Attached to the member 42 are further the confining gages 43 which aid in positioning the nut properly with reference to the saw. These gages are arranged to embrace the nut at an angle to the jaws 60 and 47 and to the cradle 45. The links 40 and 49 constituting the toggle are attached to each other by means of a pivot 50, and surrounding this pivot is a spring 55 one end of which is secured to the link 40 and the other end of which is attached to the link 49, thereby normally keeping the jaws 47 closed against the jaw 60. The work holder is normally held in its retracted position by means of the spring 57 which connects the supporting member 42 with the carrier 38. The parts are, as shown particularly in Fig. 5, preferably so proportioned and arranged that the workholders are adapted to be received in the spaces between the outwardly projecting carrier arms 39 and thus the springs 57 or equivalent devices normally serve to draw the workholders inwardly into these spaces between the arms, where they will normally lie out of the range of the saw. The inward movement of the workholder is limited by the stops 58 and 59, one of which is on the supporting member 42 and the other of which is on the arm 39. A handle 54 on the pivot 50 is utilized to open the jaws 47 and 60 when inserting a nut. A fixed cam 62 on the framework engages with the roller 52 on the link 40 to open the jaws to discharge the block which remains in the jaws after the sawing operation, as each workholder is successively brought past the said cam 62. The rotating cam 99 acts to engage the roll 52 to move the workholder outwardly toward the saw around the pivot 41, and at the same time increases the tension of the movable jaw 47 against the nut held between it, fixed jaw 60 and the cradle 45. This outward movement brings the work into engagement with the saw and continues to move the work toward the saw so as to permit the latter to enter more and more deeply into the same.

It is the practice to grade ivory nuts, before they are sawed, according to their "diameter." This "diameter" has reference to the thickness of the nut. The "length" of the nut, however, varies, so that the major axis of the nuts which have the same "diameter" is not uniform. In accordance with recent developments it has been found that the most advantageous method of sawing a nut, is to divide it on lines running diagonally to its "length" and "diameter." In Fig. 7 a nut 3 is shown inserted in the work holder. Its "length" or major axis is indicated by 5 and its "diameter" by 7. 10 is the "germ" of the nut, and the lines 28 (which are the saws) indicate the lines on which the nut is sawed, one of said lines passing substantially through the germ. In order to present the nut properly to the saws 28, the confining gages 43 are so positioned with respect to each other that the distance between them is less than the minimum "length" of the diameter of nut fed to the machine. This is effected by the spacing member 44 between the gages 43. The distance between these gages 43 being then less than the "length" of the nut, the latter will always assume a position with its "length" diagonal with respect to the saw.

The gearing utilized in imparting the various movements to the various parts of the machine may be of any suitable construction, but preferably it is as follows: 21 is the drive shaft provided with the worm 65 meshing with the worm wheel 98 on the cam shaft 8. 101 indicates a lever loosely mounted on the carrier shaft 15 and connected by means of the link 104 to the crank 105 on the worm gear 98. The link 104 is adjustable by means of the slot 102 and set screw 103. 106 is a pawl mounted on screw 103 adapted to engage with the ratchet 100 on the carrier shaft 15. Preferably a brake in the form of a split ring 107 is provided on the shaft 15. The tension of this brake is adjusted by means of the screw 109, and it is held against rotation by means of the bracket 108 straddling the block 23 bolted to the framework.

The locking device for the carrier 38 is preferably constructed as follows: The locking pin 11 is slidingly mounted in brackets and is adapted to engage with the apertures 110. This pin 11 is shouldered at 96 and is provided with a spring 97 urging the pin into engagement with the apertures 110. 13 is a rock shaft, provided with an arm 92 extending into the slot 94 of the pin 11, and having a second arm 91 carrying a roller 95 adapted to be actuated by the cam 93. When the cam shaft 8 and cam 93 are rotated the pin 11 will be disengaged from the carrier 38.

Suitable stopping and starting mechanism is provided, in this case taking the following form: Mounted on the drive shaft 21 are a fast and a loose pulley 63 and 64. 66 indicates a belt shifted by means of the shipper lever 67. This lever 67 is slidingly mounted in the brackets 68 and is provided with a spring 70 constantly urging the shipper lever to the left in Fig. 3. 72 is a stop for limiting the sliding movement of the shipper lever 67. 73 indicates a latch pivoted at 74 at right angles to the axis of shaft 21. A spring 80 urges the latch to asume a vertical position. 75 indicates a dog pivoted at 76 to the latch 73 so as to have a movement at right angles to the pivotal movement of the latch. A spring 82 urges this dog into a vertical position. This dog is provided with a projection 77 adapted to engage the pin 69 on the shipper lever, and further has a cam face 84 which, when the dog is in its upright position, is in the plane of the restoring cam 78. 89 is a foot pedal normally held in its elevated position by means of spring 90. This foot pedal is connected to the dog 75 by means of the rod 88, lever 87, shaft 17, arm 86 and rod 85.

When the machine is at rest the parts will occupy the position shown in Fig. 1. Upon the depression of the foot pedal 89, the dog 75 will be turned around its pivot 76 thereby disengaging the projection 77 from the pin 69 and this will cause the spring 70 to move the belt 66 from the loose pulley 64 to the fast pulley 63, at the same time causing the latch 73 to assume a vertical position, the cam surface 84 being brought out of the plane of the cam 78. This will cause the rotation of the cam shaft 8. The pressure on the foot pedal being released, the dog 75 will assume its vertical position behind the pin 69 and will cause the cam face 84 to be in the plane of the cam 78. When the latter has made one revolution, being carried by the cam shaft 8, it will turn the latch 73 around its pivot thereby causing the shipper lever 67 to be moved back and causing the belt 66 to be shifted to the loose pulley 64.

The operation of the machine is as follows: The foot treadle 89 is depressed thereby turning the dog 75 around its pivot and causing the shipper lever 67 to move the belt onto the fast pulley. This causes the drive shaft 21 to rotate thereby imparting motion to the cam shaft 8. The cam 99 releases its pressure on the roll 52 and permits the spring 57 to move that workholder, which is opposite to the saw, inwardly. At the same time the cam 93 acts to withdraw the locking pin 11 from engagement with the carrier 38. The pawl 106 now engages one of the teeth of the ratchet 100 on the shaft 15 moving the carrier 38 one step forward and bringing a new workholder opposite to the saw 28. The rotation of the carrier also brings one of the work holders opposite to the cam 62, which latter acts on the roller 52 to open the jaws of that workholder releasing the sawed block held thereby. As soon as the carrier 38 has moved the required distance, the pin 11 locks the carrier. The cam 99 now acts against the roller 52 of that workholder which has been brought opposite to the saw and moves the said workholder outwardly toward the saw, and at the same time causes the movable jaw 47 to grip the nut more firmly. At the completion of this movement the cam 78 will act on the latch and restore the shipper lever 67 to its former position, and the parts will be brought to a state of rest. It is understood that the saws 28 are constantly rotating, and that the nuts are placed in the workholders by hand. The jaws of the workholder are opened by means of the handle 54, and every time the operator has placed a nut in the workholder he depresses the treadle 89.

The construction of the swinging workholders is not claimed in this application and has been made the subject-matter of a divisional application, Serial No. 658,710, filed November 6, 1911.

What is claimed is:

1. In a sawing machine, a rotatable carrier, a saw rotating in a plane substantially parallel to the carrier, a plurality of workholders mounted on said carrier so as to be capable of having a movement on the carrier toward and away from the saw, means for intermittently rotating the carrier step by step to successively present the workholders adjacent to the saw, means for normally holding the workholders in a retracted position on the carrier out of the range of the saw, and means for successively moving the workholders outwardly on the carrier and into the range of the saw.

2. In a sawing machine, a rotatable carrier, a saw rotating in a plane substantially parallel to the carrier, a plurality of workholders mounted on said carrier so as to be capable of having a movement on the carrier toward and away from the saw, means for normally holding the workholders in their retracted position on the carrier out of the range of the saw, means for imparting an intermittent step by step movement to the carrier to successively present the workholders adjacent to the saw, and a cam making one revolution to each step by step movement of the carrier adapted to move a workholder outwardly on the carrier into the range of the saw.

3. In a sawing machine, a saw rotating in one direction, a carrier, a workholder pivotally mounted on said carrier, and means for swinging said workholder around said pivot toward the saw in a direction opposite to that of the direction of rotation of the saw.

4. In a sawing machine, a saw rotating in one direction, a carrier arranged substantially parallel thereto and rotating in a convergingly curvilinear direction to the saw and in the same direction as the saw, a workholder pivotally mounted on said carrier, and means for swinging said workholder around said pivot toward the saw in a direction opposite to that of the direction of rotation of the saw and carrier.

5. In a sawing machine, a rotatable carrier, a saw rotating in a plane substantially parallel to the carrier, a plurality of workholders mounted on said carrier so as to be capable of having a movement on the carrier toward and away from the saw, means for normally holding the workholders in their retracted position on the carrier out of the range of the saw, a cam shaft, a drive shaft, a stopping and starting mechanism controlling said drive shaft, a latch for said stopping and starting mechanism, means for releasing said latch to cause rotation of the drive shaft, means for causing the drive shaft to impart one revolution to the cam shaft and to impart a movement to the carrier equal to the distance between adjacent workholders on the said carrier, a cam on said cam shaft adapted to move a workholder outwardly on the carrier into the range of the saw, and a restoring cam operated by said drive shaft for restoring the latch and for causing the drive shaft to stop.

6. In a sawing machine, a rotatable carrier, a saw rotating in a plane substantially parallel to the carrier, a plurality of workholders mounted on said carrier so as to be capable of having a movement on the carrier toward and away from the saw, means for normally holding the workholders in their retracted position on the carrier out of the range of the saw, a locking device for the carrier, a cam shaft, a drive shaft, a stopping and starting mechanism controlling said drive shaft, a latch for controlling said stopping and starting mechanism, means for releasing said latch to cause rotation of the drive shaft, means for causing the drive shaft to impart one revolution to the cam shaft and to impart a movement to the carrier equal to the distance between adjacent workholders on the carrier, a cam on said cam shaft for withdrawing the locking device, a second cam on said cam shaft for moving a workholder outwardly on the carrier into the range of the saw, and a restoring cam also on said cam shaft for restoring the latch and for causing the drive shaft to stop.

7. In a sawing machine, a rotatable carrier, a saw rotating in a plane substantially parallel to the carrier, a plurality of workholders mounted on said carrier so as to be capable of having a movement on the carrier toward and away from the saw, comprising jaws adapted to be opened and closed, means for intermittently rotating the carrier step by step to successively present the workholders adjacent to the saw, means for normally holding the workholders in a retracted position on the carrier out of the range of the saw, and means for successively moving the workholders outwardly on the carrier and into the range of the saw and simultaneously therewith increasing the gripping tension of the jaws of such workholder.

8. In a sawing machine, a saw, a carrier rotating in a plane substantially parallel to the saw and provided with a plurality of outwardly projecting arms, work holders carried by the projecting arms, and normally received in the spaces between the arms so as to normally lie out of the range of the saw, means for rotating the carrier, and means for projecting the work holders outwardly into the range of the saw.

9. In a sawing machine, a saw, a carrier rotating in a plane substantially parallel to the saw and provided with a plurality of outwardly extending arms, work holders pivotally engaged on said arms and normally received in the spaces between the arms so as to normally lie out of the range of the saw, means for rotating the carrier with an intermittent motion to bring the work holders one after another into position before the saw, and means for successively projecting the work holders outwardly into the range of the saw.

10. In a sawing machine, a saw, a carrier, a plurality of workholders on said carrier, means for moving the carrier past the saw with a step by step movement, a stopping and starting device adapted to stop the carrier after each step by step movement, means for moving a workholder on the carrier into the range of the saw before the step by step movement ceases, and means for moving the same workholder out of the range of the saw after the step by step movement ceases and before the next step by step movement begins.

11. In a sawing machine, a saw, a carrier rotating in a plane substantially parallel to the saw and provided with a plurality of spaced outwardly extending arms, work holders pivoted on said arms and adapted to be received in the spaces between the arms, means for closing the work holders upon the work held thereby, means for drawing the work holders inward into the spaces between the carrier arms so as to hold the work holder normally out of the range of the saw, means for rotating the carrier to bring the work holders successively into position before the saw, means for successively projecting the work holders outwardly into the range of the saw, and means for opening the work holders to discharge the work therefrom after the same has been operated upon by the saw.

Signed at Springfield, in the county of Hampden and State of Massachusetts this 6th day of July A. D. 1910.

THOMAS F. MORRISSEY.

Witnesses:
C. J. SPILL,
GURDON W. GORDON.

Copies of this patent may be obtained for five cents each, by addressing the "Commissioner of Patents, Washington, D. C."